US009495768B1

(12) United States Patent
Elliott

(10) Patent No.: US 9,495,768 B1
(45) Date of Patent: Nov. 15, 2016

(54) MODULAR DISPLAY AND CONTROLLER

(71) Applicant: Robert Elliott, Burleson, TX (US)

(72) Inventor: Robert Elliott, Burleson, TX (US)

(*) Notice: Subject to any disclaimer, the term of this patent is extended or adjusted under 35 U.S.C. 154(b) by 0 days.

(21) Appl. No.: 14/667,209

(22) Filed: Mar. 24, 2015

(51) Int. Cl.
*G09G 5/10* (2006.01)
*G09G 5/12* (2006.01)
*G06F 3/0481* (2013.01)
*G06T 11/00* (2006.01)
*G06F 3/14* (2006.01)
*G10L 17/22* (2013.01)
*G06F 3/0485* (2013.01)

(52) U.S. Cl.
CPC ........... *G06T 11/001* (2013.01); *G06F 3/0485* (2013.01); *G06F 3/1431* (2013.01); *G09G 5/10* (2013.01); *G09G 5/12* (2013.01); *G10L 17/22* (2013.01); *G09G 2370/20* (2013.01)

(58) Field of Classification Search
CPC combination set(s) only.
See application file for complete search history.

(56) References Cited

U.S. PATENT DOCUMENTS

| 5,990,802 | A | * | 11/1999 | Maskeny | G09F 9/33 340/815.42 |
|---|---|---|---|---|---|
| 6,880,276 | B2 | | 4/2005 | Strein et al. | |
| 7,233,849 | B2 | | 6/2007 | Hill et al. | |
| 7,378,948 | B2 | | 5/2008 | Somuah | |
| 8,712,630 | B2 | | 4/2014 | Walwer | |
| 2004/0117513 | A1 | * | 6/2004 | Scott | G06F 3/038 710/1 |
| 2006/0191180 | A1 | | 8/2006 | Williams et al. | |
| 2008/0110067 | A1 | * | 5/2008 | Smith | G09F 13/00 40/541 |
| 2012/0005691 | A1 | * | 1/2012 | Wong | G06F 9/541 719/319 |
| 2012/0088429 | A1 | * | 4/2012 | Goldmeier | A63H 33/42 446/82 |
| 2012/0154591 | A1 | * | 6/2012 | Baur | B60R 1/00 348/148 |
| 2013/0100149 | A1 | * | 4/2013 | Dysart | G09F 9/33 345/531 |
| 2013/0253999 | A1 | | 9/2013 | Pinkus et al. | |
| 2013/0289971 | A1 | * | 10/2013 | Parkinson | G10L 15/26 704/2 |
| 2014/0081764 | A1 | | 3/2014 | James | |
| 2014/0316900 | A1 | | 10/2014 | Amla et al. | |
| 2016/0019834 | A1 | * | 1/2016 | Hall | G09G 3/3208 345/212 |

* cited by examiner

*Primary Examiner* — Wesner Sajous
(74) *Attorney, Agent, or Firm* — James E. Walton

(57) ABSTRACT

A modular display and controller for providing information from user configurable display comprising a series of interconnected display modules. Users are able to physically attach and electrically attach arrayed rows of lighting elements together to form a variety of shaped signs for the display of scrolling information.

15 Claims, 19 Drawing Sheets

MODULAR DISPLAY AND CONTROLLER

BACKGROUND

1. Field of the Invention

The present invention relates in general to the field of module displays for indicating textual based information via a user defined display.

2. Description of Related Art

Presently factory assembled displays provide users the ability to change the displayed content. Users are, however, not able to assemble signs from individual modules. Computer monitors can be combined to form a virtual desktop but require extensive programming and hardware to combine multiple displays into a single display. While there are many ways to display textual information well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6D is a partial detailed schematic of a modular display according to the present application;

Figure 1:
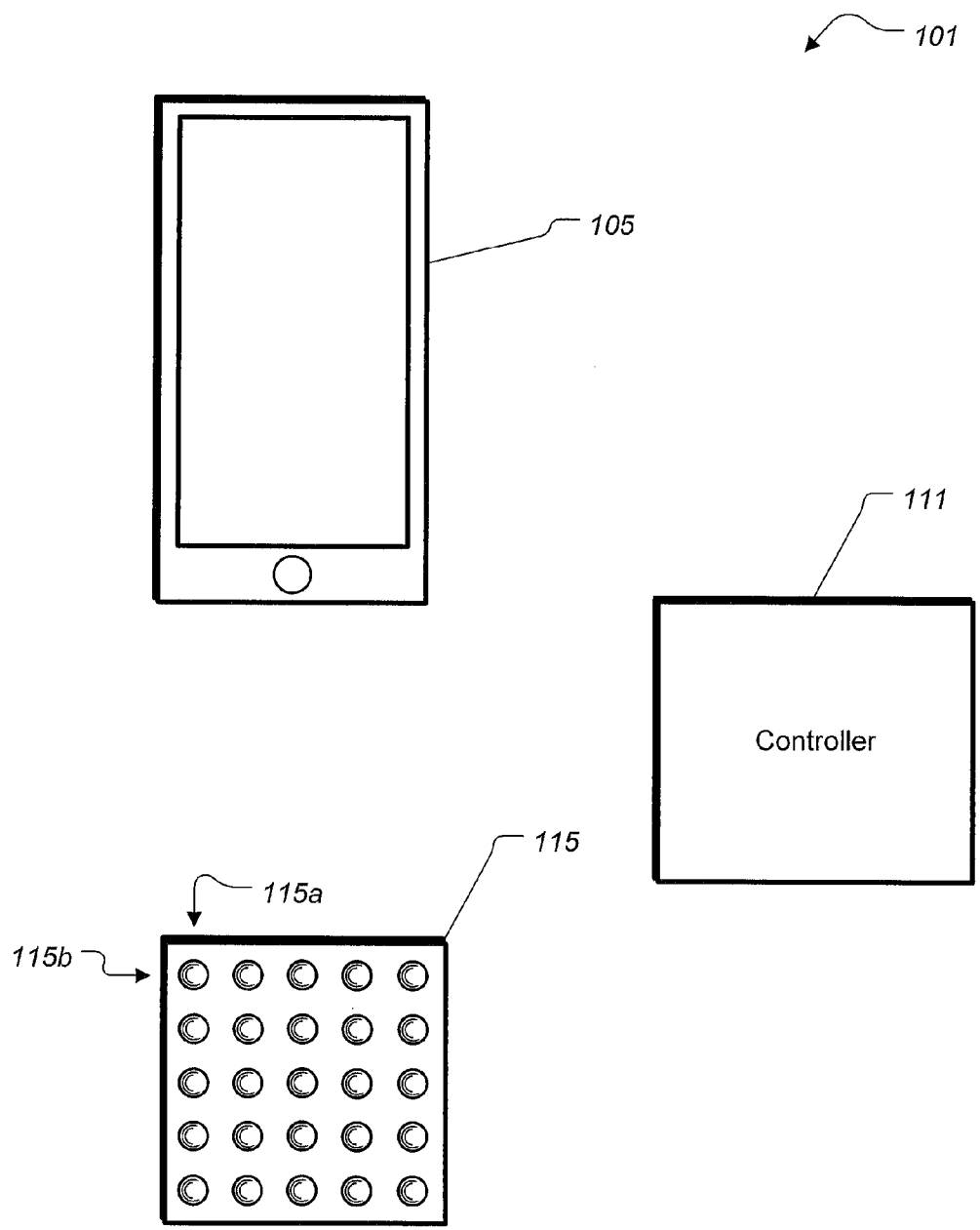
FIG. 1 is a plan view of a preferred embodiment of a modular display and controller according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method for modular displays and controller are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Users today desire readily configurable and customizable displays or signs for displaying textual information. Much like a toy building system a modular display system allows users to create a certain shaped display today and a different shaped display tomorrow from parts that combine to create a single display thereby allowing for modularity. A system for displaying information is comprised of an input device, a controller, and a display. Typically a user inputs the textual information into the input device. The input device is in electrical communication with the controller. The controller takes the users inputs and generates commands to control light elements arrayed into a display. The user creates the display by arranging and connecting a series of display modules to form a combined display. Providing the ability to arrange and connect a series of displays provides customization not seen in other displays.

Referring now to FIG. 1 in the drawings, a preferred embodiment of a modular display and controller according to the present application is illustrated. System 101 is a depiction of an improved module display and controller. System 101 includes an input device 105, a controller 111, and a display 115.

The input device 105 is preferably a smart phone having a wireless module or transceiver for digital communications with the controller 111. The preferred standard for wireless communications between the controller 111 and the input device 105 is Bluetooth. It should be apparent that other wireless personal area network standards are contemplated such as Wi-Fi, Infrared, ZigBee, Z-Wave, and 6LoWPAN. Controller 111 is able to command the display 115 to illuminate other information from the input device such as stock prices and emails when their IFTTT recipes are triggered on the input device. Input device 105 is configured for converting the spoken words of the user into ASCII characters for transmission to the controller 111.

A user of system 101 preferably speaks into a microphone of input device 105. Input device 105 converts the human language into alphanumeric information. The alphanumeric information is wirelessly sent to the controller 111 which in turn drives display 115 to illuminate corresponding light elements such that the user's spoken words are illuminated on the display 115. Alternatively, the user is able to type into the input device 105 the alphanumeric information they want illuminated on the display 115 via a keyboard.

Display 115 includes twenty five sockets. Each socket containing an individually controlled lighting element such as a light emitting diode (LED) or incandescent bulb. Preferably each LED is of the same color. Display 115 is illustrated as being square in shape however other shapes are contemplated such as rectangular, diamond, curved, circular, and so forth. Each display includes a quantity of columns, such as first column 115a, and rows, such as first row 115a. For the system 101 to work with multiple displays, each display must include the same number of rows so that the scrolling message appears correctly as it scrolls from display to display.

Each edge of the display 115 includes a half of a coupling so that the display 115 can be physically coupled to another display. It should be apparent that each edge of the display 115 can be connected to another display to form a series of displays.

System 101 typically includes a single input device 105, a single controller 111, and several displays 115 of various shapes and sizes. Users are able to mechanically attach several displays together to form a loop or annular shape. The loop or ring shape of displays is preferred because of the scrolling nature of the displays. As the scrolling text ends on the far end of the chain of display it starts again on the near end. Locating the far end near the near end creates an illusion of never ending text scrolling across the chain of modular displays. Electrically, the chain of modular displays includes the controller at the near end and serially connected displays wired together.

Figure 2:
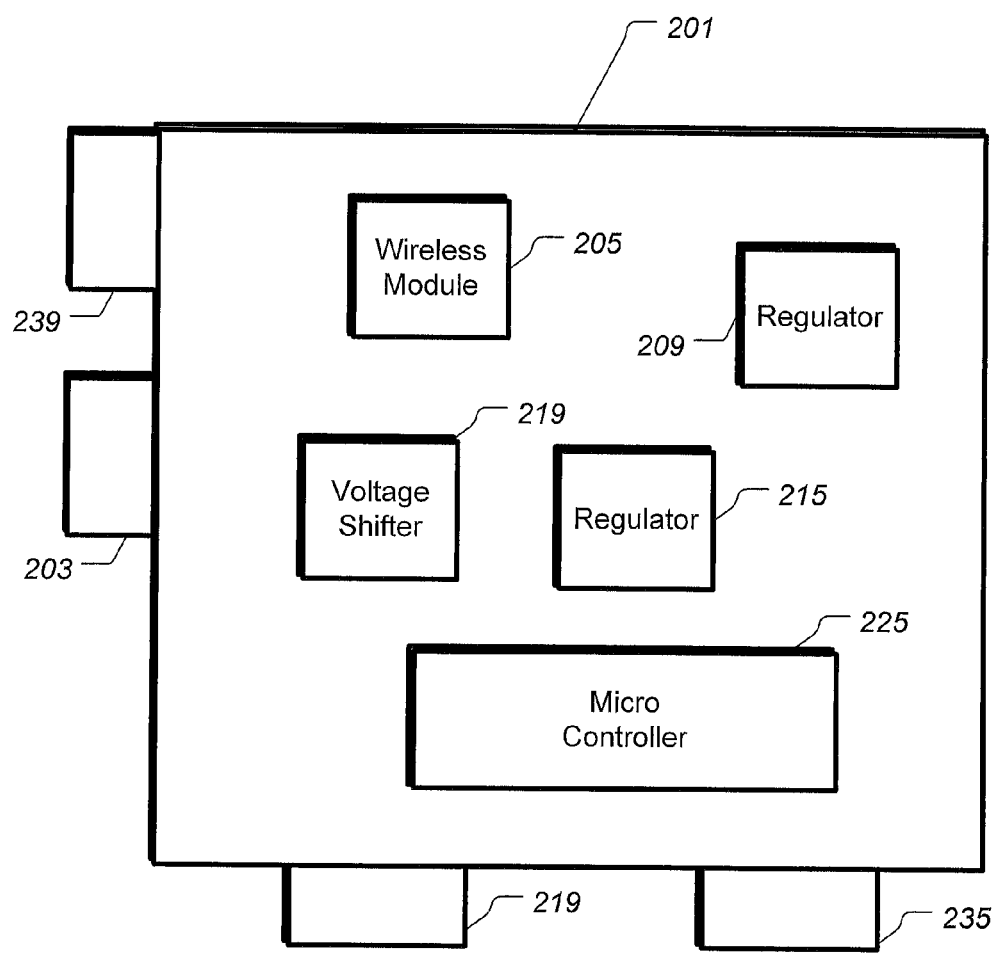
FIG. 2 is a plan view of a controller according to the present application.

Referring now also to FIG. 2 in the drawings, a plan view of an embodiment of a controller according to the present application is illustrated. Controller 201 converts the wireless commands from the input device into series data for illuminating the array of lighting elements on the display. Controller 201 includes an input power plug 203, a wireless module 205, a first regulator 209, a second regulator 215, a voltage shifter 219, a micro controller 225, a USB plug 219, and a RJ11 plug 235, and a series data plug 239. Alternatively controller 201 further comprises a photo-resistive sensor for adjusting the brightness of the display relative to the ambient lighting around the system. Typically controller is battery powered into the input power plug 203 however, this application contemplates plugging the controller into a standard wall outlet for non-portable installations.

Wireless module 205 or receiver is preferably a Bluetooth transceiver for wireless communication with the input device. Wireless module provides the digital input for the micro controller 225. It should be apparent that other wireless personal area network standards are contemplated such as Wi-Fi, Infrared, ZigBee, Z-Wave, and 6LoWPAN to be received by wireless module 205. First regulator 209 and second regulator 215 provide the supply voltages to the wireless module 205, the voltage shifter 219, and the micro controller 225 from the input power plug 203.

Micro controller 225 receives digital instructions via a RS-232 bus from the wireless module 205. Micro controller 225 creates a serial stream of data corresponding to the commands from the input device. The serial stream of data is outputted from the series data plug 239 to the display. USB plug 219 allows a user to program operating instruction of the wireless module 205. RJ11 plug 235 allows a user to program operating instruction of the micro controller 225.

Figure 3:
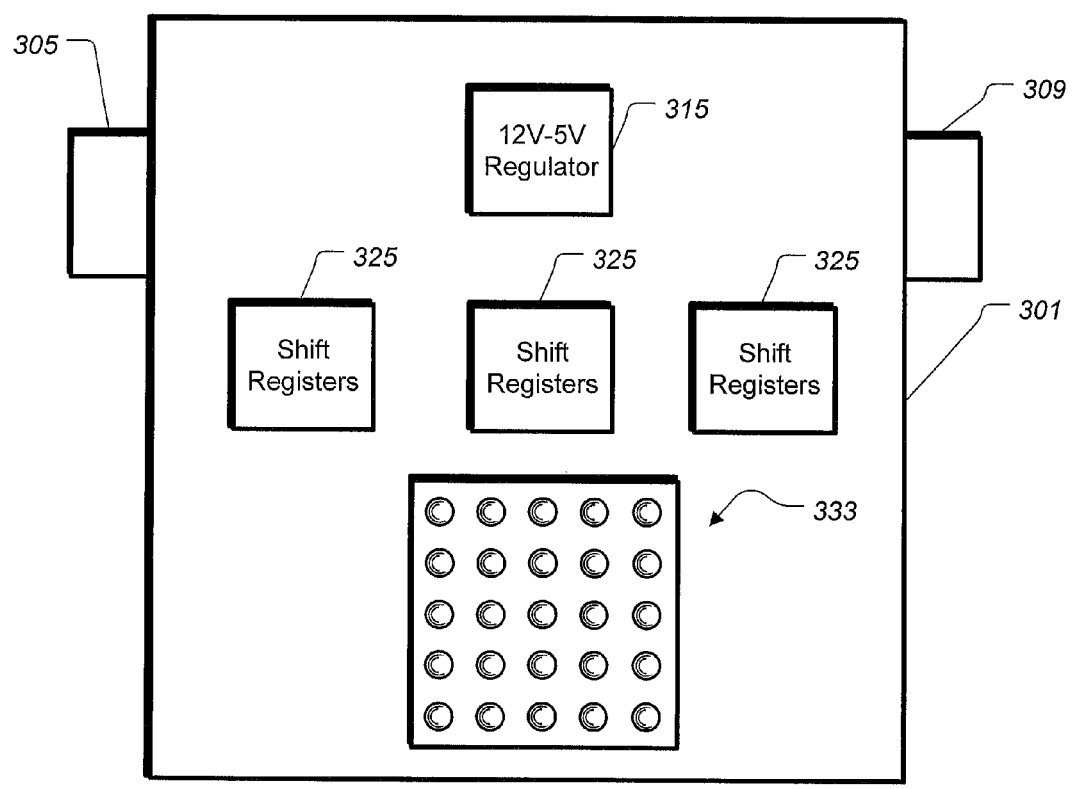
FIG. 3 is a plan view of a modular display according to the present application.

Referring now also to FIG. 3 in the drawings, a plan view of an embodiment of a display module according to the present application is illustrated. Display module 301 converts the serial data for illuminating the array of lighting elements on the display into lighting commands. Display module 301 includes a first serial data socket 305, a second serial data socket 309, a voltage regulator 315, a plurality of shift registers 325, and a plurality of lighting elements 333.

Regulator 315 converts the 12V supply voltage to 5V for the lighting elements 333. Lighting elements 333 are single bulb light emitting diodes arrayed to form a grid like structure. Shift registers 325 convert the serial data from the controller into individual commands for the individual lighting elements 333.

Figure 4A:
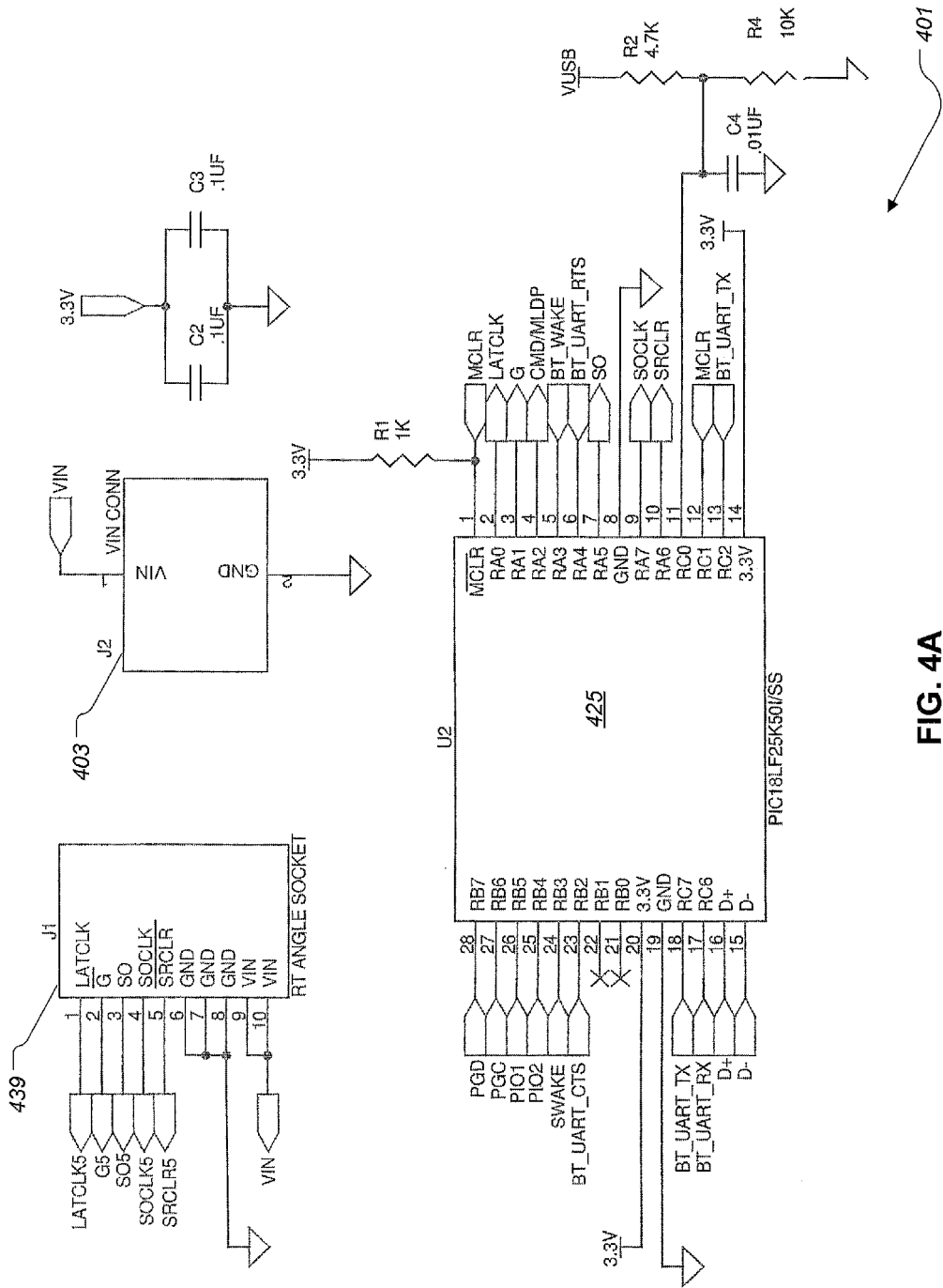
FIG. 4A is a detailed schematic of a controller according to the present application.
Figure 4B:
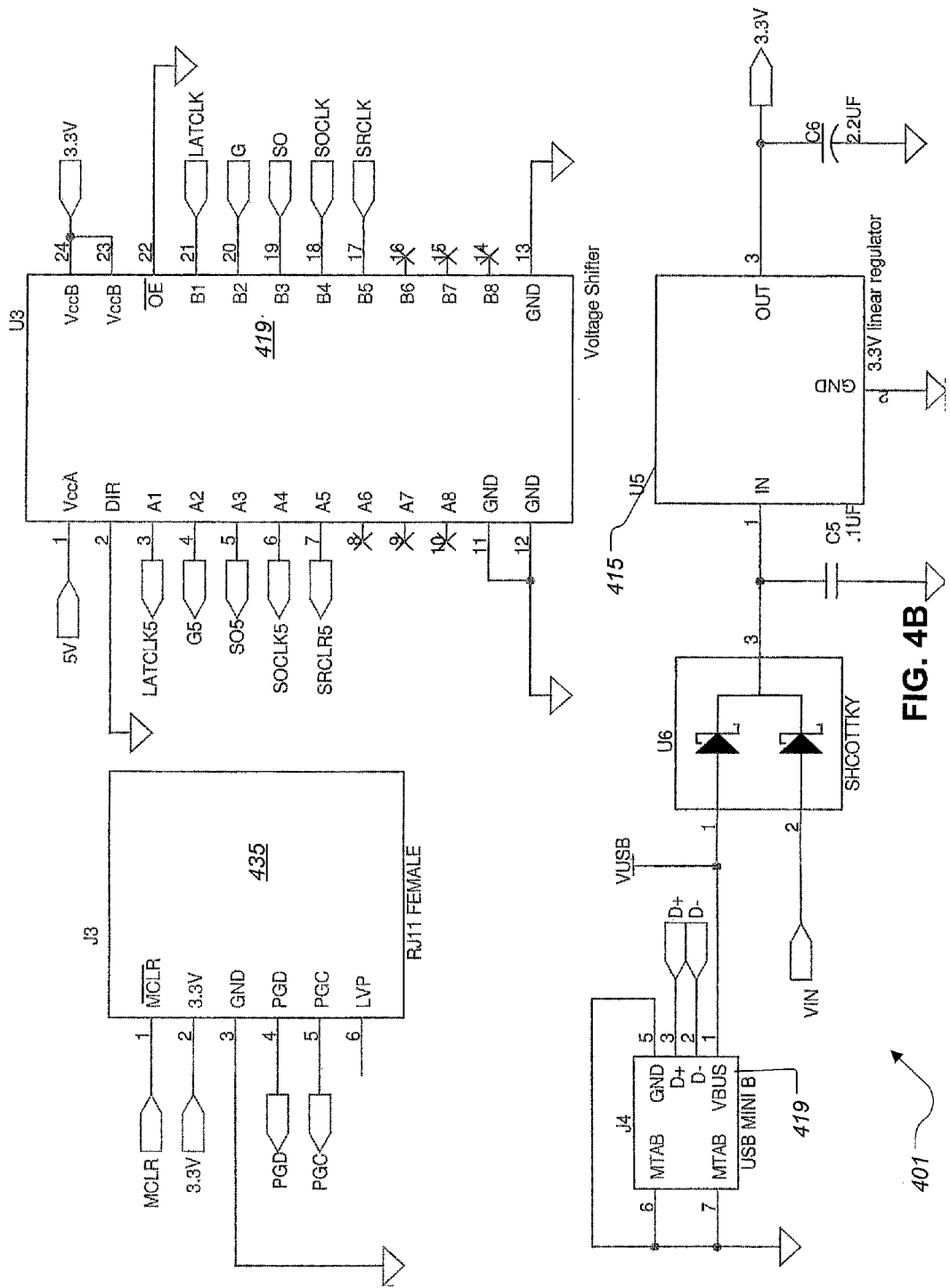
FIG. 4B is a detailed schematic of a controller according to the present application.
Figure 4C:
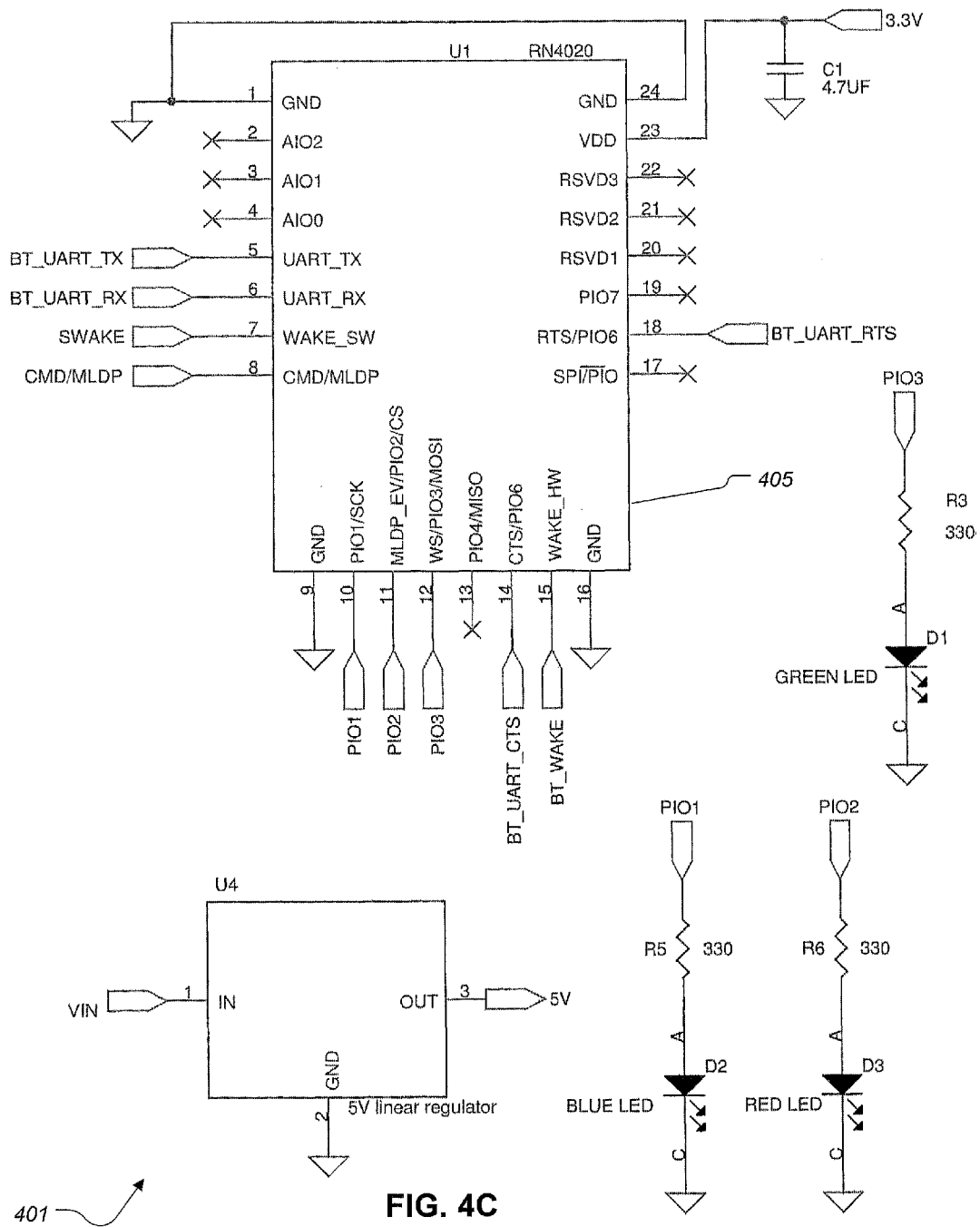
FIG. 4C is a detailed schematic of a controller according to the present application.

Referring now also to FIG. 4 in the drawings, a detailed schematic of an embodiment of a controller according to the present application is illustrated. Controller 401 converts the wireless commands from the input device into series data for illuminating the array of lighting elements on the display. Controller 401 includes an input power plug 403, a wireless module 405, a first regulator 409, a second regulator 415, a voltage shifter 419, a micro controller 425, a USB plug 419, a RJ11 plug 435, and a series data plug 439.

Figure 5A:
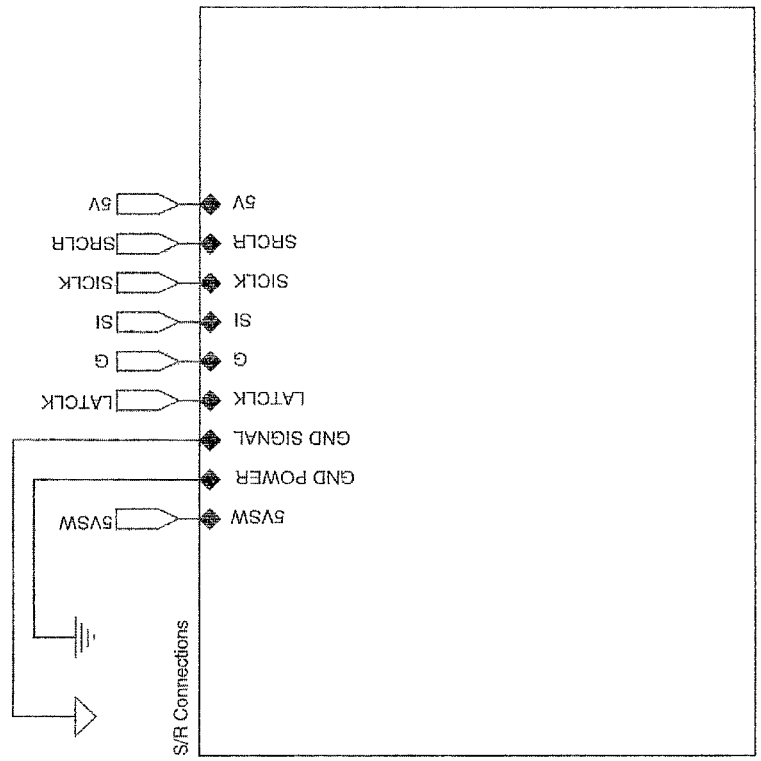
FIG. 5A is a partial detailed schematic of a modular display according to the present application.
Figure 5A:
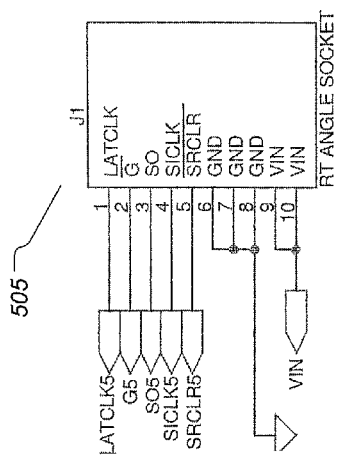
Figure 5B:
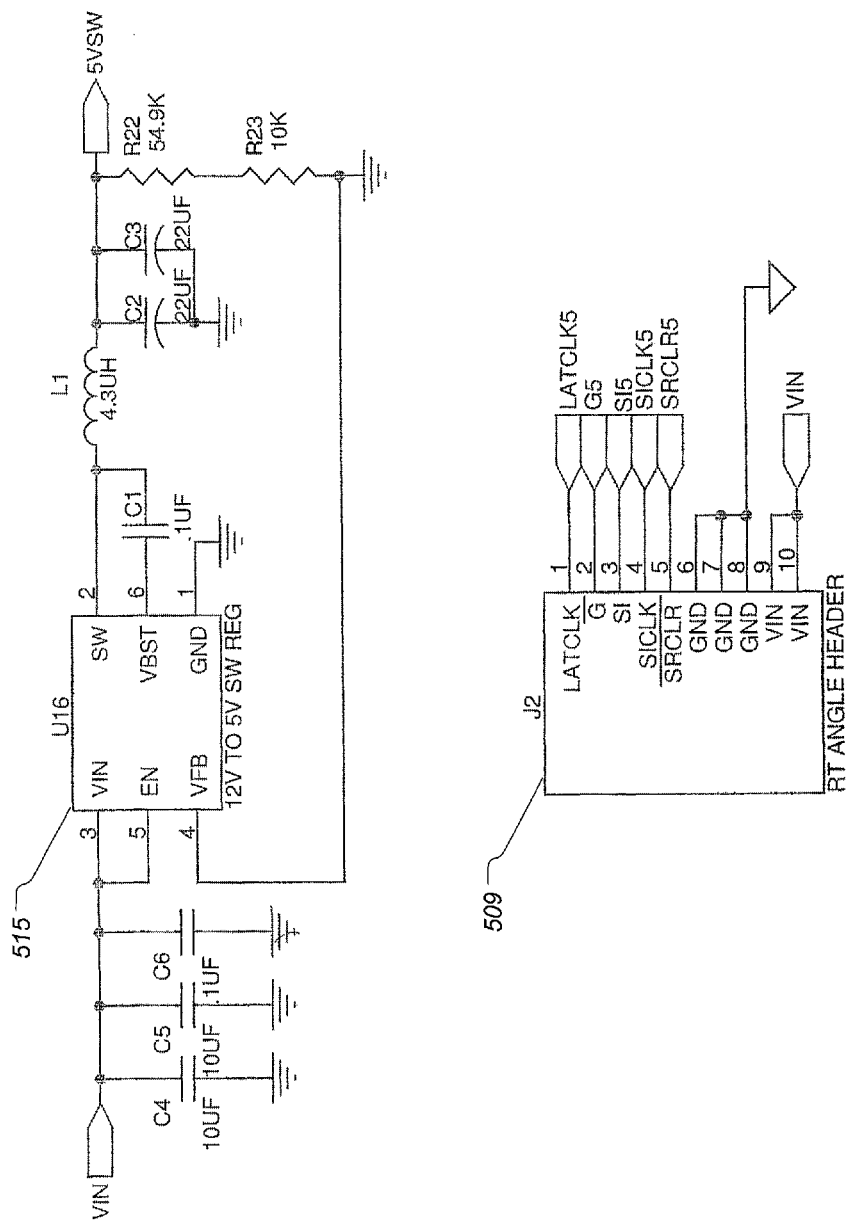
FIG. 5B is a partial detailed schematic of a modular display according to the present application.
Figure 6A:
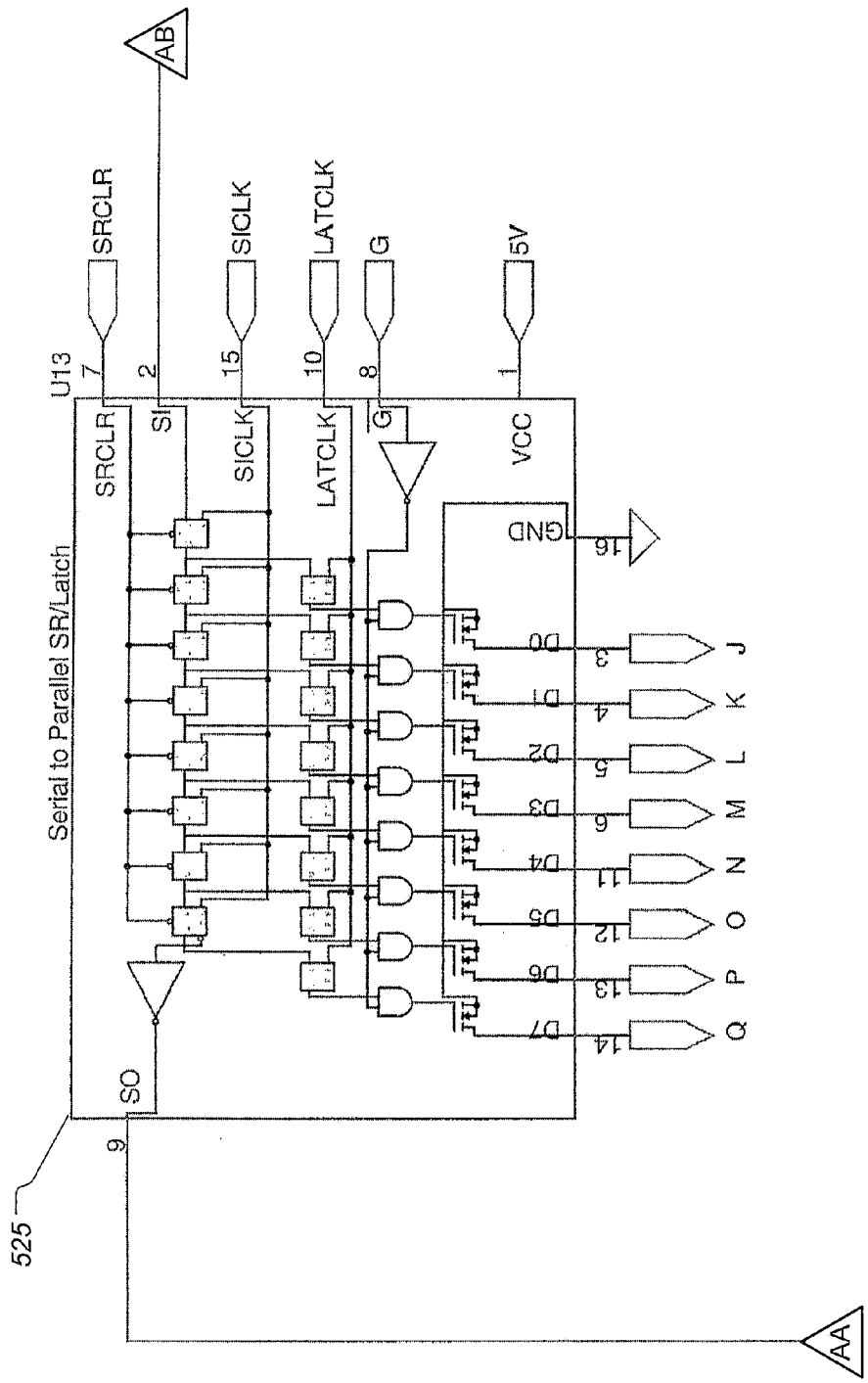
FIG. 6A is a partial detailed schematic of a modular display according to the present application.
Figure 6B:
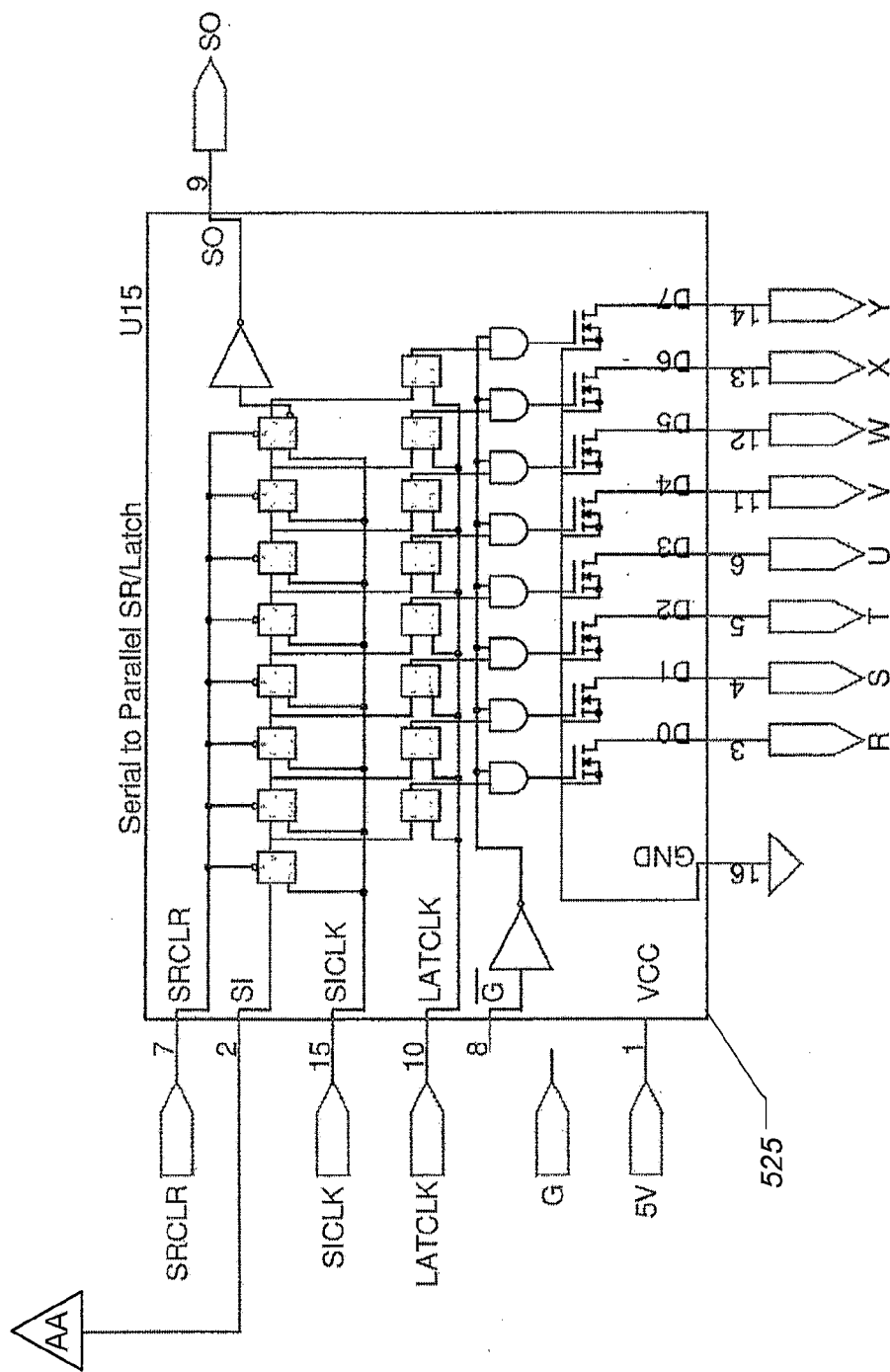
FIG. 6B is a partial detailed schematic of a modular display according to the present application.
Figure 6C:
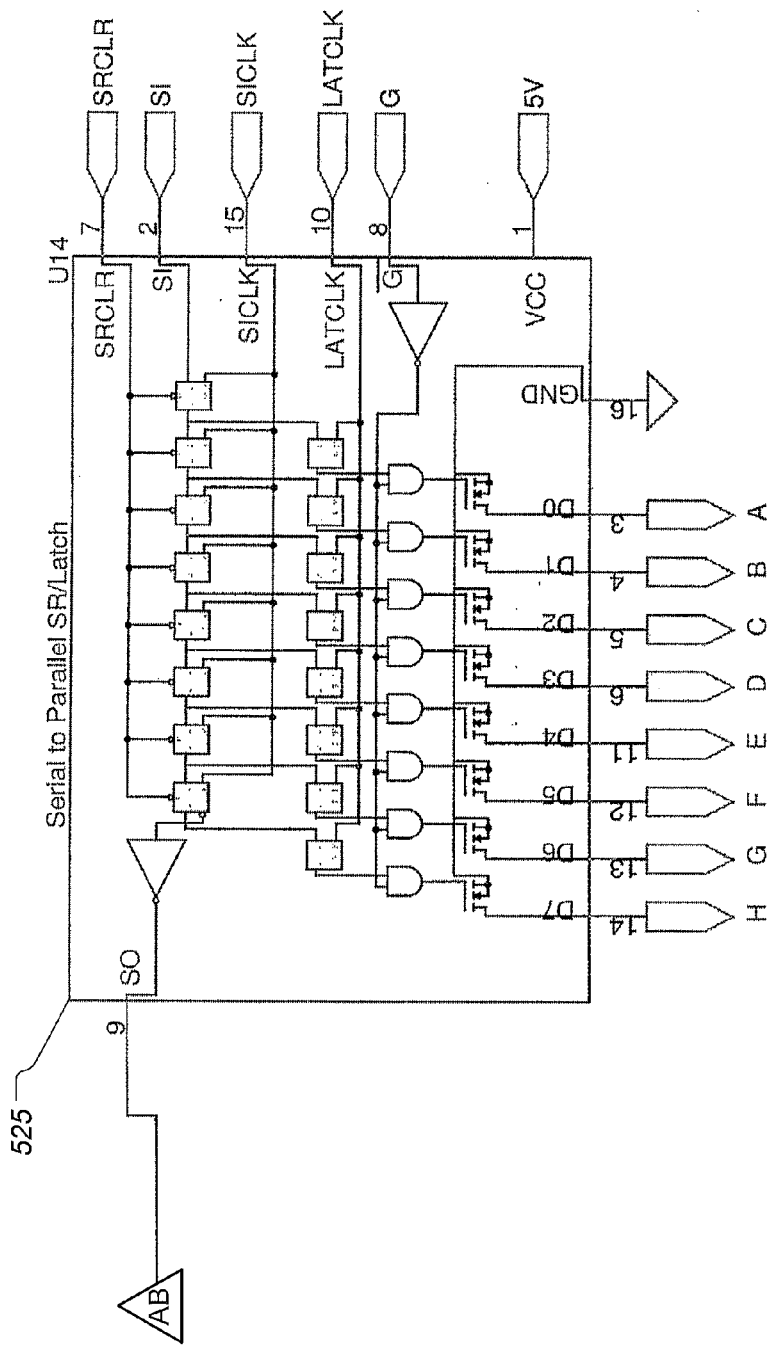
FIG. 6C is a partial detailed schematic of a modular display according to the present application.
Figure 7A:
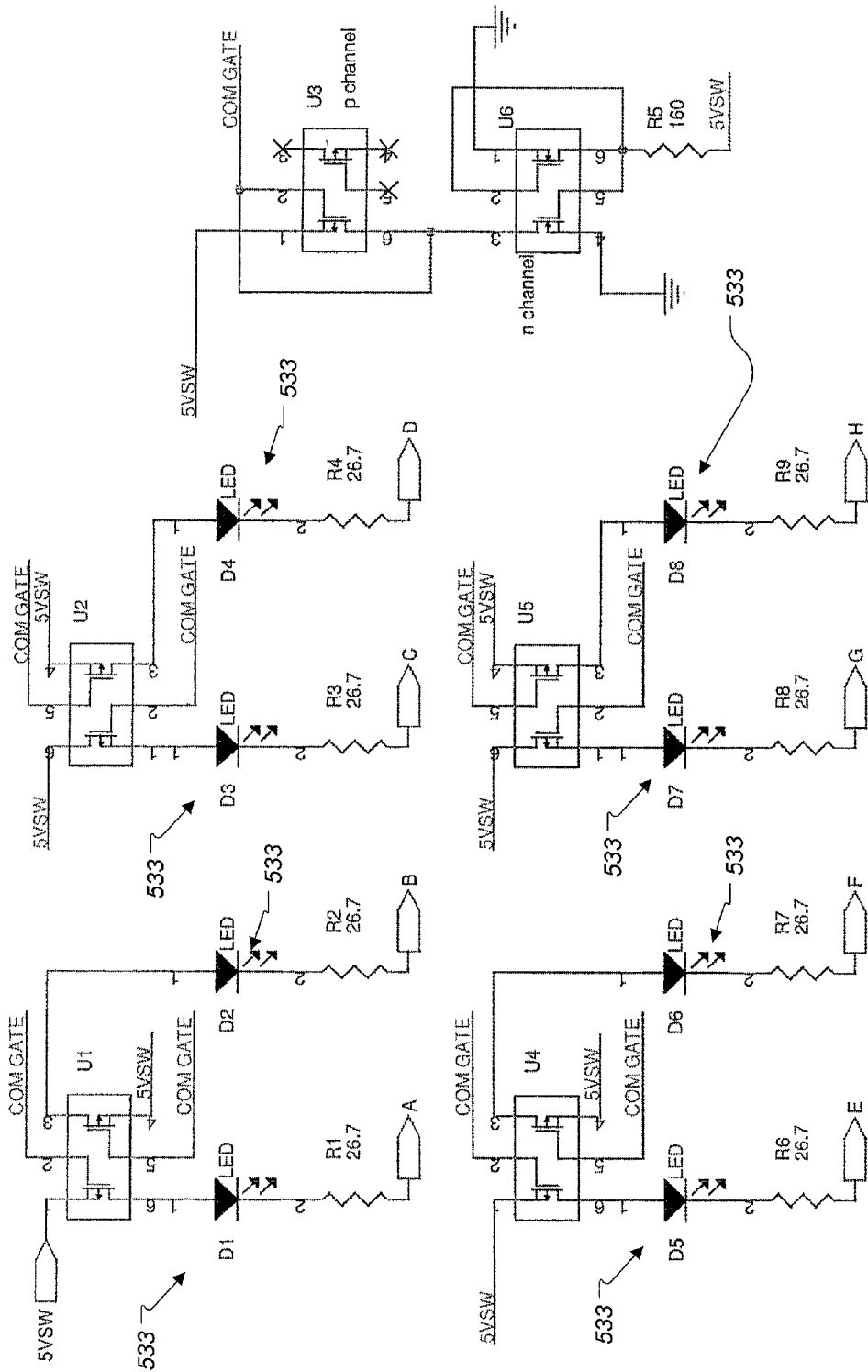
FIG. 7A is a partial detailed schematic of a modular display according to the present application.
Figure 7B:
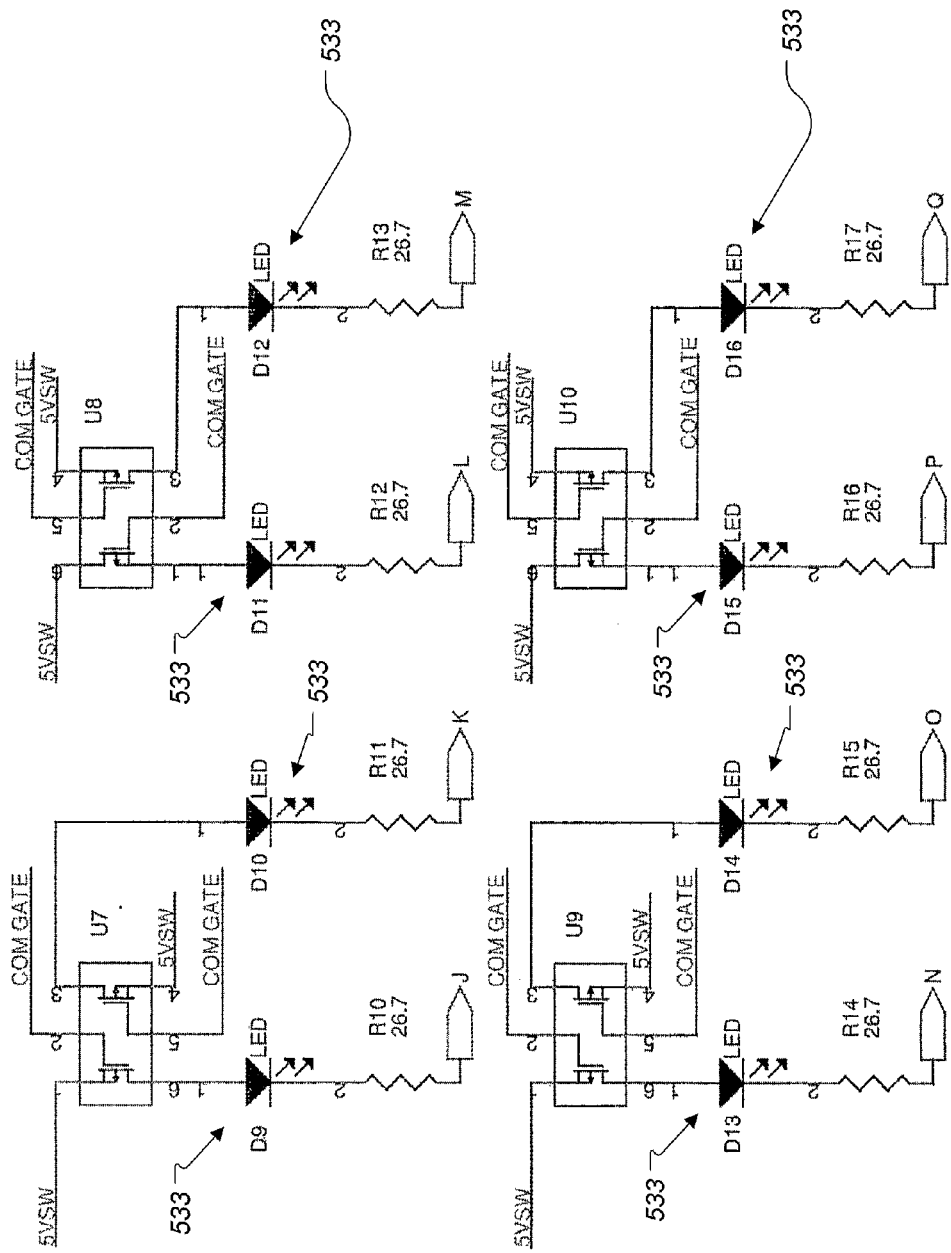
FIG. 7B is a partial detailed schematic of a modular display according to the present application.
Figure 7C:
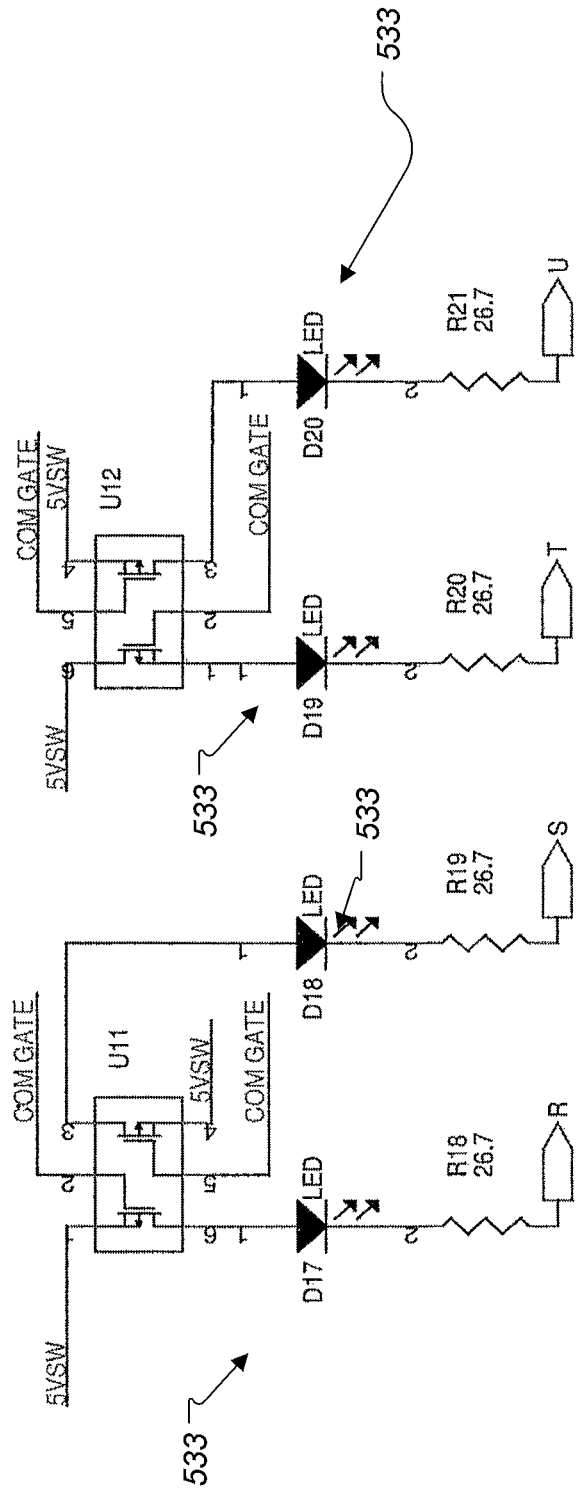
FIG. 7C is a partial detailed schematic of a modular display according to the present application.

Referring now also to FIGS. 5, 6, and 7 in the drawings, detailed schematics of an embodiment of a display module according to the present application are illustrated. Display module 501 converts the serial data for illuminating the array of lighting elements on the display into lighting commands. Display module 501 includes a first serial data socket 505, a second serial data socket 509, a regulator 515, a plurality of shift registers 525, and a plurality of lighting elements 533.

Figure 8A:
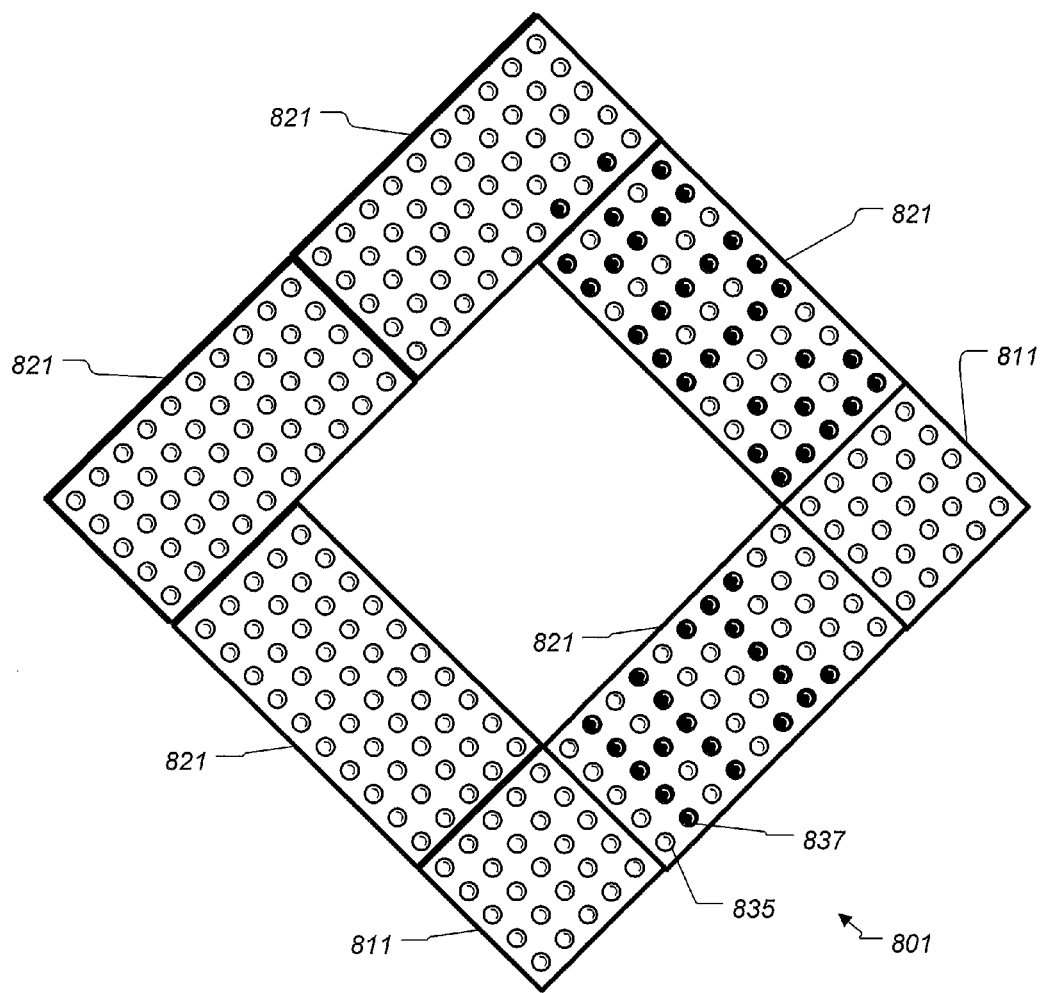
FIG. 8A is a plan view of an arranged modular display in a first state according to the present application.
Figure 8B:
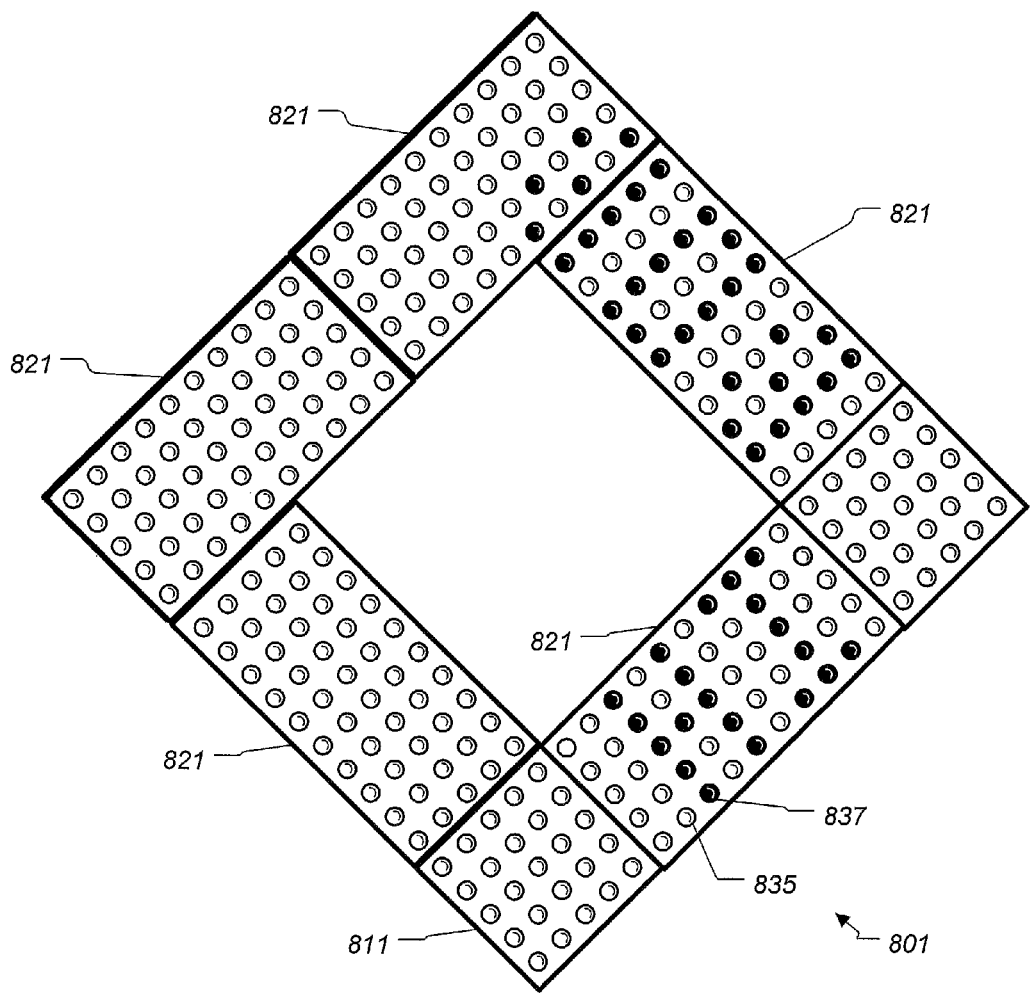
FIG. 8B is a plan view of an arranged modular display in a second state according to the present application.

Referring now also to FIGS. 8A and 8B in the drawings, front view of an embodiment of a modular display system according to the present application is illustrated. System 801 includes a plurality of display modules interconnected serially to a controller (not shown). Each of the plurality of display modules contains an equal number of rows. Controller is typically hidden from the front view behind one of the display modules for aesthetic purposes. A user was able to combine two square display modules 811 with five rectangular display modules 821 to form a ring shaped continuous display. As shown the user spoke into the input device the phrase "HI BOB" and the phrase "HI BOB" was illuminated. It should be apparent that lighting element 835 is off and lighting element 837 is on. The message 835 will scroll down the length of the ring as certain lighting elements are switched on or off as needed to spell "HI BOB." The modular display elements such as square display modules 811 and rectangular display module 821 allow users to design and assembly a scrolling textual display to suit their own tastes and needs. For example, a user can add scrolling text to a picture frame by assembling a series of modular display elements into a ring and attaching the display ring to the outer edge of the picture frame. Because picture frames come in a variety of sizes the modular nature of the system 801 allows users to customize their picture frames.

The scrolling textual display can be seen when comparing FIG. 8A to 8B. The position of the text "HI BOB" has been shifted over one column. The speed of the scrolling text across the display is adjustable by the user.

Figure 9:
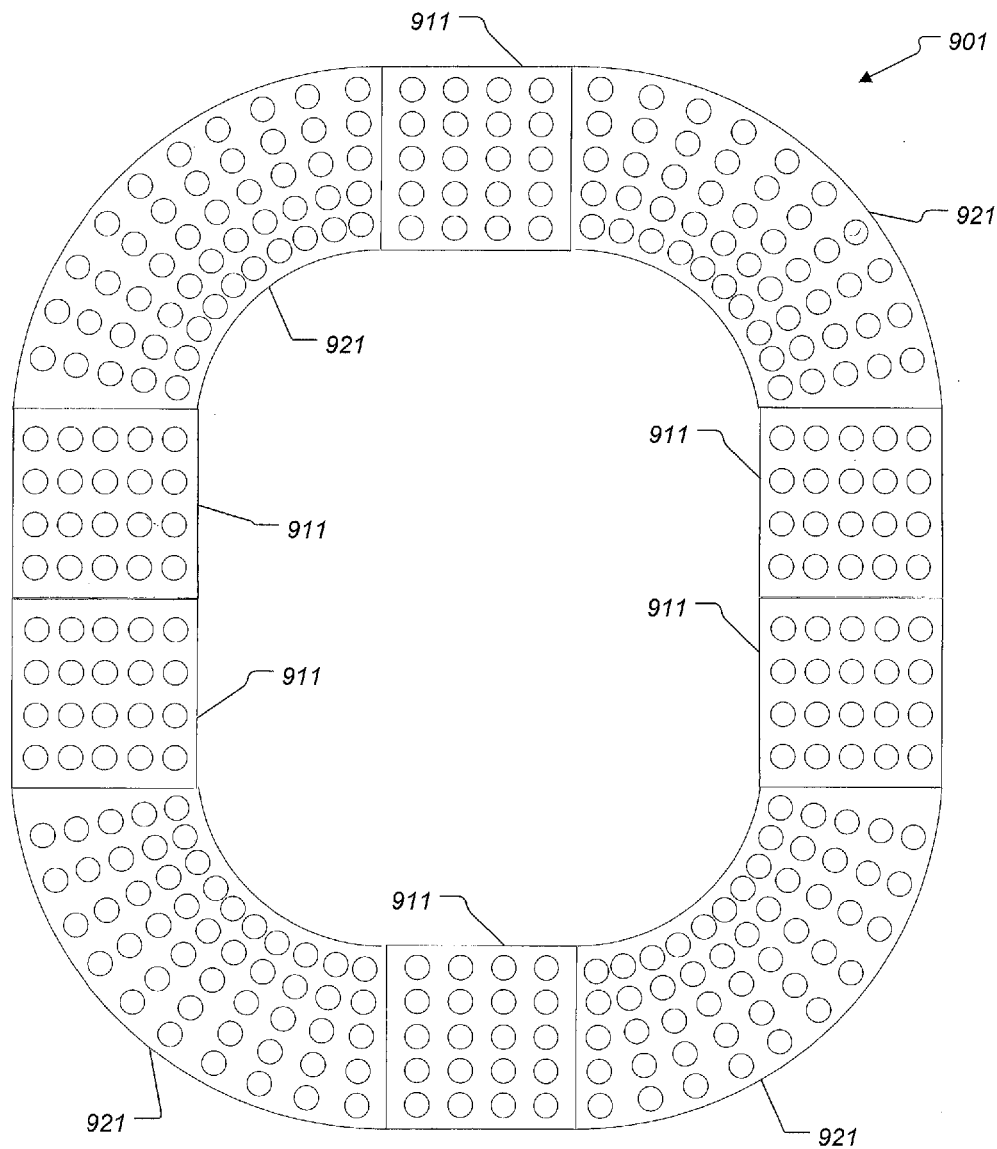
FIG. 9 is a plan view of an arranged modular display according to the present application.

Referring now also to FIG. 9 in the drawings, a front view of an alternate embodiment of a modular display system according to the present application is illustrated. System 901 includes square display modules 911 and curved display modules 921 to form a flat ring suitable for hanging on a wall. Alternately, a user can create a heart shaped sign from a few curved display modules with a few straight display modules.

Figure 10:
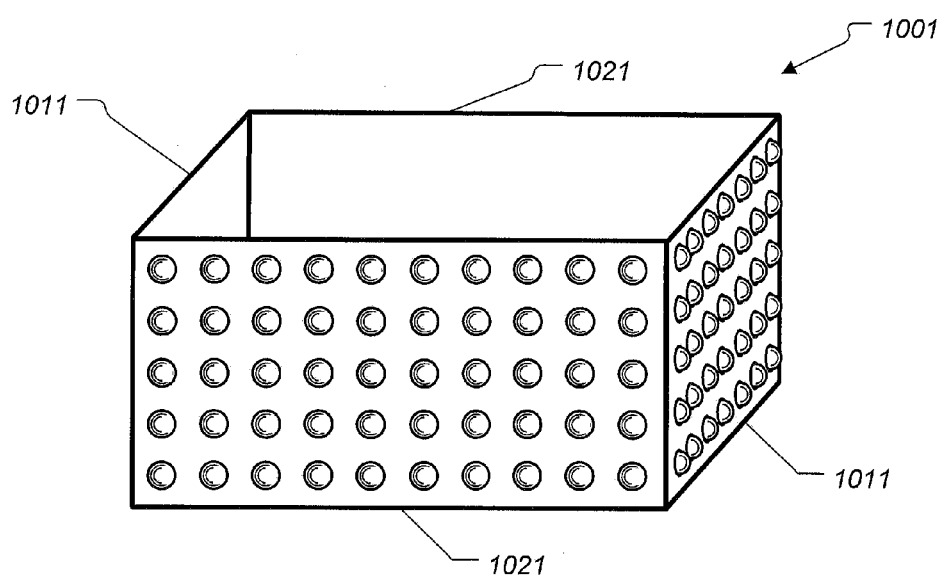
FIG. 10 is an isometric view of an arranged modular display according to the present application.

Referring now also to FIG. 10 in the drawings, an isometric view of an alternate embodiment of a modular display system according to the present application is illustrated. System 1001 includes square display modules 1011 and rectangular display modules 1021. System 1001 faces the display modules outwardly such that the message displayed can be seen from more than one side of the system unlike the system 901.

System 901 can include an attachment bracket for coupling the system to a drone vehicle. The modular nature of the system 901 allows users to adjust the size of the system 901 to match the footprint and payload capacity of the user's drone. The sizes of drones can vary greatly and requires displays that can adjust accordingly.

Figure 11:
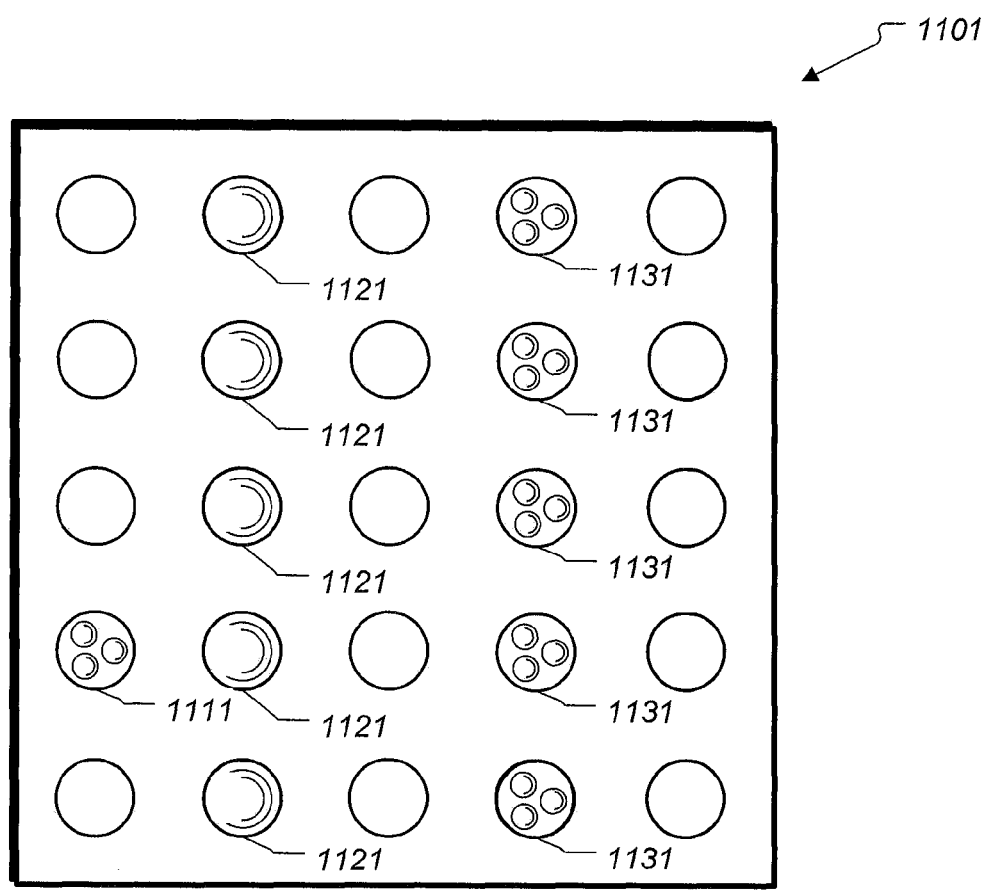
FIG. 11 is a plan view of an arranged modular display with configurable lighting elements according to the present application.

Referring now also to FIG. 11 in the drawings, a front view of an alternate embodiment of a modular display system according to the present application is illustrated. Modular display 1101 unlike the modular displays described above do not include a lighting element in every socket. Modular display 1101 allows a user to further customize their sign by individualizing each lighting element in each socket. For example, the user placed a three color LED 1111 in column 1 row 4, single color LED's 1121 in column 2, and three color LED's 1131 in column 4.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for displaying information, comprising:
    an input device for providing textual data;
    a controller for converting the textual data into commands;
    a first display, having;
        a plurality of lighting elements arranged into rows;
        a first data socket located on a first edge;
        a second data socket located on a second edge; and
        a coupling located on each edge of the first display; and
    a second display, having;
        a plurality of lighting elements arranged into rows;
        a first data socket located on a first edge;
        a second data socket located on a second edge; and
        a coupling located on each edge of the second display;
        wherein the first display and the second display are attached together by connecting the coupling on the first display to the coupling on the second display.

2. The system according to claim 1, the further comprising:
    a wireless system connecting the input device to the controller.

3. The system according to claim 2, wherein the wireless system is Bluetooth based.

4. The system according to claim 1, the plurality of lighting elements comprising:
    light emitting diodes;
    wherein the light emitting diodes are replaceable.

5. The system according to claim 1, further comprising:
    mounting adapter for mounting the first display and the second display to a drone.

6. A modular sign for displaying information, comprising:
    an input device, configured for converting spoken words into ASCII characters;
    a controller, configured for converting the ASCII characters into a pattern;
    a first modular display for illuminating the pattern;
    a second modular display for illuminating the pattern;
    a third modular display;
    wherein the first modular display is coupled adjacent the second modular display;
    wherein the second modular display is coupled adjacent the third modular display;
    wherein the pattern scrolls linearly along the first modular display, the second modular display and the third modular display.

7. The modular sign according to claim 6, wherein the first modular display and the second modular display are arranged into a flat loop.

8. The modular sign according to claim 6, wherein the input device is a smart phone.

9. The modular sign according to claim 6, wherein the first modular display is curved.

10. The modular sign according to claim 6, wherein the first modular display comprises:
    a shift register;
    a voltage regulator; and
    an array of light emitting diodes arranged into rows and columns.

11. The modular sign according to claim 6, the input device comprising:
    a wireless transceiver; and
    the controller comprising;
    a wireless receiver;
    wherein the controller is in wireless communication with the input device.

12. The modular sign according to claim 6, wherein the controller comprises:
    a sensor for adjusting the brightness of the display.

13. A modular system for displaying textual information to a user, comprising:
    a first display, having;
        a shift register;
        a voltage regulator; and
        an array of lighting elements arranged into rows and columns;
    a second display, having;
        a shift register;
        a voltage regulator; and
        an array of lighting elements arranged into rows and columns; and
    a controller for supplying serial data to the first display and the second display;
    wherein each edge of each display comprises half a coupling;
    wherein the half coupling of the first display is connected to the half coupling of the second display to form a linear multi-paneled display;
    wherein the first display and the second display contain an equal number of rows; and wherein the serial data drives the first display and the second display;

wherein the textual information scrolls across the first display and then scrolls across the second display.

14. The modular system for displaying textual information to a user according to claim 13, further comprising:

an input device in wireless communication with the controller;

wherein the controller receives commands from the input device.

15. The modular system for displaying textual information to a user according to claim 13, wherein a speed at which the textual information is scrolled is adjustable.

\* \* \* \* \*